US006851945B2

(12) United States Patent
Potter et al.

(10) Patent No.: US 6,851,945 B2
(45) Date of Patent: Feb. 8, 2005

(54) SEAL-LESS REUSABLE VACUUM BAG

(75) Inventors: John Potter, Camarillo, CA (US);
William Mead, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 236 days.

(21) Appl. No.: 10/316,564

(22) Filed: Dec. 11, 2002

(65) Prior Publication Data

US 2004/0115299 A1 Jun. 17, 2004

(51) Int. Cl.[7] .............................................. B29C 70/44
(52) U.S. Cl. .................... 425/389; 156/285; 156/382
(58) Field of Search ........................ 425/389; 156/285, 156/286, 382

(56) References Cited

U.S. PATENT DOCUMENTS

| | | | |
|---|---|---|---|
| 3,553,054 A | | 1/1971 | Maus |
| 4,560,428 A | | 12/1985 | Sherrick et al. |
| 4,584,364 A | | 4/1986 | Lubowitz et al. |
| 4,681,651 A | | 7/1987 | Brozovic et al. |
| 4,698,115 A | | 10/1987 | Dodds |
| 4,702,376 A | | 10/1987 | Pagliaro |
| 4,822,436 A | | 4/1989 | Callis et al. |
| 4,836,765 A | | 6/1989 | Kornitzky et al. |
| 4,842,670 A | | 6/1989 | Callis et al. |
| 5,123,985 A | * | 6/1992 | Evans et al. ............... 425/389 |
| 5,286,438 A | | 2/1994 | Dublinski et al. |
| 5,316,462 A | * | 5/1994 | Seemann .................... 425/389 |
| 5,370,598 A | * | 12/1994 | Corneau, Jr. ............... 493/220 |
| 5,716,488 A | | 2/1998 | Bryant |
| 5,807,593 A | | 9/1998 | Thompson |
| 6,739,861 B2 | * | 5/2004 | Cournoyer et al. .......... 425/389 |

OTHER PUBLICATIONS

Encyclopedia of Polymer Science and Engineering, vol. 7, pp. 257–267, 1987, John Wiley & Sons, Inc.*
Encyclopedia of Polymer Science and Engineering, vol. 16, pp. 601–611, 1987, John Wiley & Sons, Inc.*

* cited by examiner

*Primary Examiner*—Robert B. Davis
(74) *Attorney, Agent, or Firm*—Stetina Brunda Garred & Brucker

(57) ABSTRACT

A reusable vacuum bag is configured for application of at least one sealant bead for providing vacuum tight sealing of the reusable vacuum bag to a forming tool during fabrication of a composite part. The reusable vacuum bag comprises at least one elastomeric layer and a fluoroelastomeric strip. The elastomeric layer is sealable to the forming tool and has a sealing flange extending peripherally thereabout. The fluoroelastomeric strip extends substantially along the sealing flange and has first and second surfaces. The elastomeric layer and the fluoroelastomeric strip each have polymers and a peroxide curative. The peroxide curative initiates vulcanization wherein the polymers of each material cross-link at an elevated temperature to form double-oxygen bonds such that a permanent bond is formed between the sealing flange and the fluoroelastomeric strip at the first surface. The fluoroelastomeric strip is releaseably adhered at the second surface to the sealant bead.

21 Claims, 2 Drawing Sheets

SEAL-LESS REUSABLE VACUUM BAG

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to vacuum bags and, more particularly, to an improved reusable vacuum bag configured for application of at least one sealant bead for sealing the reusable vacuum bag to a forming tool during fabrication of a composite part on the forming tool.

The production of composite parts requires the application of pressure onto a composite part against a forming tool. The vacuum bag is used for debulking the composite part such that wrinkles and trapped air in the composite part may be forced out under vacuum pressure. The vacuum bag is also utilized to hold the composite part against the forming tool while uncured resin is impregnated therein by vacuum pressure. The vacuum bag is further used for curing the resin in the composite part in an autoclave or in an oven at elevated temperature and pressure. After curing, the composite part is returned to room temperature. The vacuum bag is then removed from the forming tool so that the composite part may be separated from the forming tool.

Because the construction of vacuum bags is time-consuming, expensive, and requires skilled personnel, it is desirable that the vacuum bag be reusable. A common vacuum bag material is nylon. For fabricating composite parts on a forming tool having small inside and outside radii, nylon vacuum bags are desirable as the thin nylon film can be laid over the composite part on the forming tool. The nylon film can then be hand conformed to the small inside radii of the forming tool. However, nylon loses considerable resiliency after a single use in an autoclave and therefore cannot be reused to fabricate another composite part. Furthermore, composite parts fabricated using nylon vacuum bags may exhibit flaws in that wrinkles and pinholes may appear due to the bunching up of the nylon film against the forming tool under vacuum pressure. Leakage of the seal between the vacuum bag and the forming tool has also limited production of composite from nylon vacuum bags. As an alternative, silicone rubber has been utilized to fabricate vacuum bags because it has an elongation of over 500% which allows it to stretch over small radii on forming tools. Furthermore, silicone rubber has a maximum exposure temperature of 500° F. which allows for greater curing cycle flexibility. Finally, as compared to nylon, silicone rubber retains its resiliency over many autoclave cycles and is therefore suitable as a reusable vacuum bag material.

Importantly, the seal between the vacuum bag and the forming tool is critical in the quality of the resulting composite part as any loss of uniform vacuum pressure adversely affects the quality of the cured part. Common sealing techniques include the use of clamps located at the bag border. However, their use is cumbersome and the seal is not always reliable. Magnets may also be spaced around the bag border. However, magnets are only practical for use with relatively flat steel forming tools, and are not useful in border areas on non-steel tools. Mechanical seals such as channels, grooves and keys formed in the base plate of the forming tool may work reasonably well for composite parts with relatively large curvatures. However, for forming tools having small inside and outside radii, mechanical seals cannot be used. Commercial sealant tapes may be used to seal the vacuum bag to the forming tool due to their hand-moldable, highly conformable, putty-like consistency. Zinc chromate sealant tape is one such sealant tape that is widely used in composite part manufacturing. Zinc chromate sealant tape is not limited by the material of the forming tool as it adheres to both metallic and composite forming tools.

However, a principal limitation in the use of silicone rubber for reusable vacuum bags is that standard sealant tapes do not readily adhere to silicone rubber due to the inherently natural lubricity of silicone. Although commercial sealants, including zinc chromate sealant tape, adhere to and cleanly remove from metal or composite forming tools after use, these commercial sealants do not adhere to silicone rubber. Attempts have failed at combining the reusable characteristics of a silicone rubber vacuum bar with a commercially available vacuum bag sealant and, more particularly, to improve the adhesion of commercial sealant to a silicone rubber vacuum bag.

Another limitation in the use of silicone rubber is that it is subject to chemical attack by tacifiers in sealant tapes. A reusable vacuum bag must be resistant to attack and degradation from acids, caustics, and tacifiers such as those that may be found within the many commercially available sealant tapes. Unfortunately, silicone rubber is highly susceptible to chemical attack from tacifiers in these sealant tapes. Reusable vacuum bags formed of silicone rubber may lose their mechanical strength and tear resistance due to exposure to tacifiers emanating from compounds in the sealant tape. Although initially hard, the compounds soften at the elevated temperatures typical of autoclaves and ovens. The softening compounds form into tacifiers that attack silicone rubber and degrade the mechanical properties of the silicone rubber such that after two or three autoclave cycles, the bag must be discarded.

The prior art discloses several reusable vacuum bags that are fabricated from silicone rubber. U.S. Pat. No. 4,842,670 (Callis et al.) entitled "MOLDED VACUUM BAG FOR DEBULKING AND AUTOCLAVING LAMINATES OF COMPLEX SHAPES" describes a silicone rubber vacuum bag assembly which can be used repeatedly to debulk and autoclave composite layups. The bags are formed of a single layup of uncured silicone rubber over a forming tool. Portions of the bag which may overlay recesses and female radii are removed. The silicone rubber is vacuum bagged in a nylon bag and cured in an autoclave. The recesses are then filled with uncured silicone rubber followed by a second cure period. After removal of the nylon bag from the forming tool, each of the vacuum bag assemblies is post-cured to stabilize and preshrink the silicone rubber. The vacuum bag assembly may be bonded to a frame for sealing to the forming tool. Although the resulting silicone rubber vacuum bag is reusable and exhibits good conformability, the added complexity of a frame may increase the cost of such a vacuum bag. Furthermore, the addition of a frame eliminates the ability to use the vacuum bag on some complex shapes.

U.S. Pat. No. 4,698,115 (Dodds) entitled "SILICONE RUBBER VACUUM BAG TOOL AND METHOD OF FABRICATING SAME" describes a reusable vacuum bag tool utilizing a silicone rubber sheet as the bag material wherein edges of the bag are prepared so that a commercially available sealant tape may be used to seal the vacuum bag to a forming tool. The silicone rubber sheet has strips of silicone elastomeric material adhered to the edges. The strips are cured to the surface of the sheet along the edges. To seal the reusable vacuum bag to a base plate of the forming tool, a strip of adhesive tape, commercially available as Mosites #14206 from the Mosites Rubber Company, is adhered to each strip of silicone elastomeric material. Although the silicone vacuum bag described in the reference is reusable, the Mosites sealant tape would not be applicable for use on complex contoured forming because wrinkling of the tape will occur when applied to small radii, resulting in leakage during vacuum pull.

Thus, there exists a need in the art for a reusable vacuum bag for forming composite parts having small radii of curvature. Additionally, there exists a need for a reusable vacuum bag that can be effectively sealed to a forming tool to hold a vacuum during autoclaving. Finally, there exists a need for a reusable vacuum bag to which commercially available sealant tape may be adhered and which has higher resistance to tears during use.

BRIEF SUMMARY OF THE INVENTION

The present invention specifically addresses and alleviates the above referenced deficiencies associated with the sealing of reusable vacuum bags to a forming tool. More particularly, the present invention is an improved border configuration for sealing a reusable vacuum bag to a forming tool and a method of fabricating the reusable vacuum bag. As will be demonstrated below, the reusable vacuum bag of the present invention differs from reusable vacuum bags of the prior art in that it utilizes a fluoroelastomeric strip for sealing the reusable vacuum bag to the forming tool with commercially available sealant tape. In addition, the reusable vacuum bag of the present invention provides improved tack and adhesion to sealant tape, thus allowing for a vacuum tight seal to the forming tool. Finally, the combination of the fluoroelastomeric strip with silicone rubber provides a reusable vacuum bag with improved mechanical properties capable of withstanding the wear and tear of multiple manufacturing cycles.

In accordance with the present invention, there is provided a reusable vacuum bag that is configured for the application of a sealant bead for vacuum tight sealing of the reusable vacuum bag to a forming tool. The forming tool has a contoured surface incorporating the desired shape of the composite part to be formed. The forming tool perimeter may be a generally flat or contoured surface to which the reusable vacuum bag is sealed for debulking or autoclaving operations.

The reusable vacuum bag is comprised of at least one elastomeric layer and a fluoroelastomeric strip. The elastomeric layer may be formed of silicone rubber provided in either a cured or uncured state. The elastomeric layer is sealable against the forming tool and transmits autoclave pressure to the composite part when a vacuum is drawn thereagainst. The reusable vacuum bag may include a release layer disposed on the surface of the composite part on the side opposite the forming tool to allow detaching of the composite part from the forming tool after autoclaving. The reusable vacuum bag may also include a breather layer disposed on the surface of the release layer on the side opposite the composite part. The breather layer may have exposed interstices for drawing a vacuum between the reusable vacuum bag and the forming tool and to allow passage of gas volatiles that may be generated by the composite part as it cures during curing. The elastomeric layer has a sealing flange extending peripherally thereabout. The fluoroelastomeric strip extends substantially along the sealing flange and has first and second surfaces. Although silicone does not adhere to sealant tapes and is subject to chemical attack from tacifiers in the sealant tape, it has been found that Mosites #10320-C. manufactured by the Mosites Rubber Company of Fort Worth, Tex., is a fluorinated synthetic rubber which is chemically inert and which thus has excellent resistance to attack from sealant tape tacifiers with no substantial degradation in its mechanical properties even after repeated contact with tacifiers. The high resistance to attack from tacifiers is due in part to its relatively high fluorine content of 70%. In addition, commercial sealant tapes readily adhere to Mosites #10320-C.

The elastomeric layer and the fluoroelastomeric strip may each include polymers and a peroxide curative. The peroxide curatives initiate vulcanization wherein the polymers of each material cross-link at an elevated temperature to form double-oxygen bonds such that a permanent bond is formed between the sealing flange and the fluoroelastomeric strip at the first surface. Mosites #10320-C can be permanently bonded to Mosites #10320-C due in part to the peroxide curative contained within the #10320-C compound. The fluoroelastomeric strip is releaseably adhered at the second surface to the sealant bead.

The reusable vacuum bag may be fabricated by providing the elastomeric layer having a sealing flange, and covering the forming tool with the elastomeric layer. A fluoroelastomeric strip is positioned between the sealing flange and the forming tool such that the fluoroelastomeric strip is substantially aligned along the sealing flange. The forming tool may be overlaid with a model part prior to covering with the elastomeric layer to compensate for the thickness of the composite part. Such a model part would be preformed and would have the same thickness and geometric features of the composite part. If the laminate thickness is small and the lateral geometric features are not too large, the model part need not be incorporated into the process for fabricating the reusable vacuum bag. The reusable vacuum bag overlaying the forming tool is then vacuum bagged with a nylon bag using conventional bagging techniques. The reusable vacuum bag is then cured by placing in an autoclave or oven at elevated temperature and pressure. After curing, the nylon bag and the reusable vacuum bag are removed from the forming tool. The reusable vacuum bag is stabilized by postcuring in an oven at ambient pressure and elevated temperature in order to minimize further shrinkage of the reusable vacuum bag.

BRIEF DESCRIPTION OF THE DRAWINGS

These as well as other features of the present invention will become more apparent upon reference to the drawings wherein.

DETAILED DESCRIPTION OF THE INVENTION

The present invention will now be described in particular with reference to the accompanying drawings.

Figure 1:
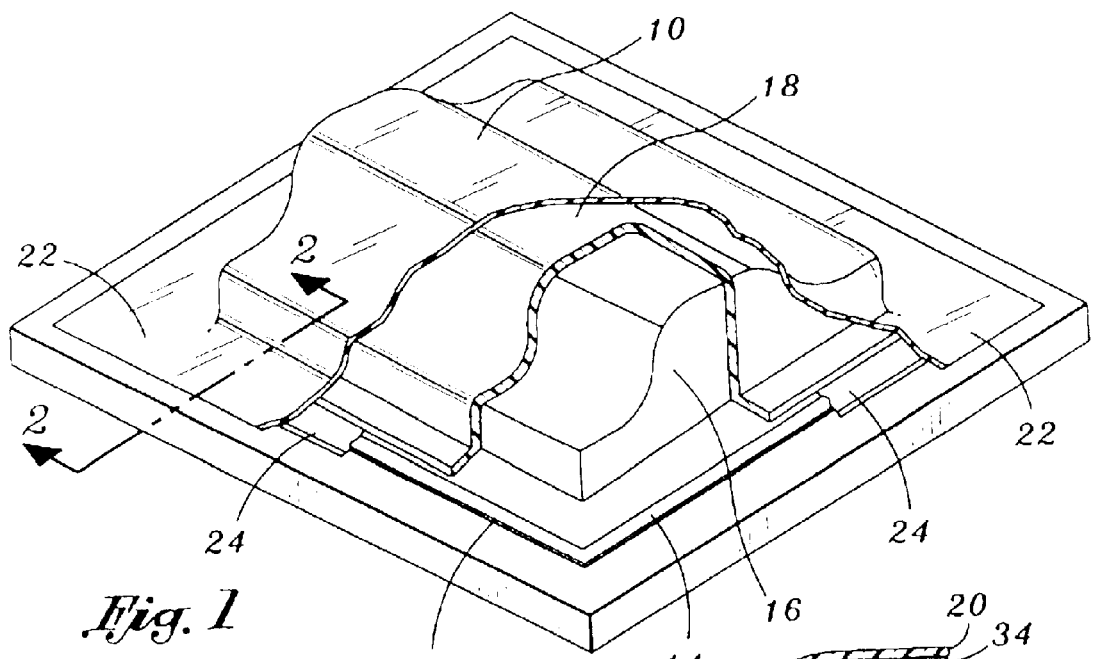
FIG. 1 is a broken away perspective view of a composite part formed on a forming tool utilizing a reusable vacuum bag of the present invention.

FIG. 1 illustrates a composite part 18 formed on a forming tool 16 utilizing a reusable vacuum bag 10 of the present invention. In FIG. 1, the forming tool 16 is shown having a contoured surface incorporating the desired shape of the composite part 18 to be formed. The forming tool 16 perimeter may be a flat or a contoured surface to which the reusable vacuum bag 10 is sealed during preparation of the composite part 18, shown in FIG. 1, for debulking or curing. Composite part 18 material is typically comprised of sheets or plies of woven or unidirectional filamentary material. The plies are laid over the forming tool 16. The plies are generally pre-impregnated with resin and are then placed on the forming tool 16. A vacuum pressure is drawn on the plies and the forming tool 16 with the aid of the reusable vacuum bag 10. The entire assembly of the forming tool 16, the composite part 18 and the reusable vacuum bag 10 is then placed in an autoclave in which the layup is finally cured through the application of further pressure at an elevated temperature. After removal from the autoclave and cooling down to room temperature, the reusable vacuum bag 10 and the composite part 18 are removed from the forming tool 16.

The reusable vacuum bag 10 of FIG. 1 is comprised of at least one elastomeric layer 20 and a fluoroelastomeric strip 24. The elastomeric layer 20 is sealable to the forming tool 16. It is contemplated that there may be multiple elastomeric layers 20 that make up the reusable vacuum bag 10. The elastomeric layer 20 may be formed of silicone rubber which may be provided in either a cured or uncured state. Furthermore, it is contemplated that the silicone rubber may have a thickness of from about 0.030 inches to about 0.120 inches, although the thickness of the silicone rubber may be of a thickness outside such a range depending on other variables such as the relative radii of curvature in the forming tool 16 and the overall size of the forming tool 16. It is further contemplated that the elastomeric layer 20 may have variable thicknesses at different sections on the reusable vacuum bag 10. For example, in sections where the reusable vacuum bag 10 traverses small male or female radii of the forming tool 16, the elastomeric layer 20 may be thinner to allow the reusable vacuum bag 10 to more readily stretch and conform the composite part 18 to the forming tool 16. In sections where the reusable vacuum bag 10 traverses broad, relatively flat sections of the forming tool 16, the elastomeric layer 20 may be thicker. The elastomeric layer 20 transmits autoclave pressure to the composite part 18 when a vacuum is drawn thereagainst. The reusable vacuum bag 10 is configured for application of at least one sealant bead 14, shown in FIGS. 1 and 2 and described in more detail below.

Figure 2:
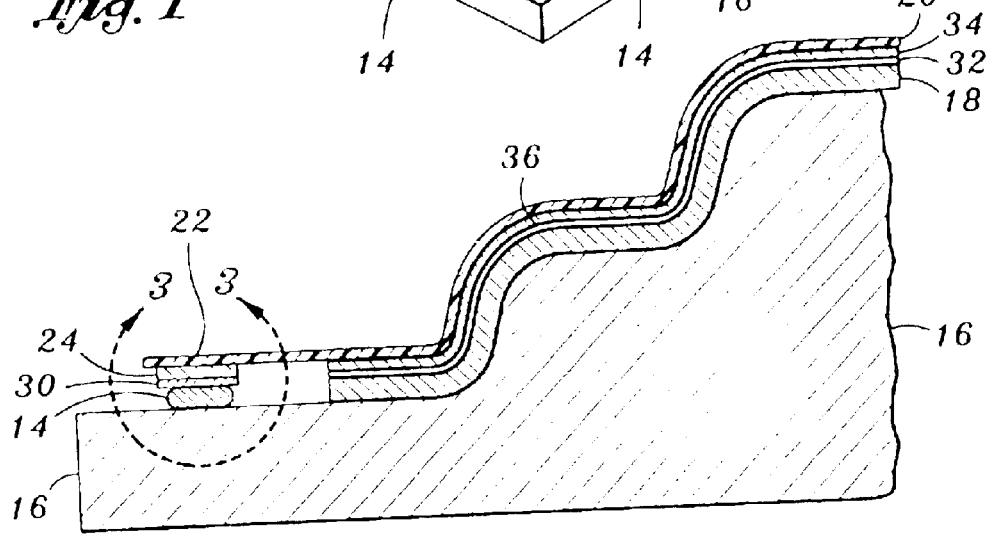
FIG. 2 is an enlarged partial longitudinal sectional view taken along line 2—2 of FIG. 1 illustrating the arrangement of the layers that make up the reusable vacuum bag of the present invention.

FIG. 2 is an enlarged partial longitudinal sectional view taken along line 2—2 of FIG. 1 illustrating the arrangement of the layers that make up the reusable vacuum bag 10. Although not necessary, the reusable vacuum bag 10 may further include at least one release layer 32, shown in FIG. 2, disposed on the surface of the composite part 18 on the side opposite the forming tool 16. The release layer 32 may provide release properties to the reusable vacuum bag 10 such that the reusable vacuum bag 10 is detachable from the composite part 18 after autoclaving. The release layer 32 may be fluorinated ethylene propylene material or it may be a TEFLON release film or a TEFLON coated fabric. The reusable vacuum bag 10 may also include a breather layer 34, also shown in FIG. 2, disposed on the surface of the release layer 32 on the side opposite the composite part 18. The breather layer 34 may have exposed interstices 36 for drawing a vacuum between the reusable vacuum bag 10 and the forming tool 16. Such interstices 36 may allow passage of gas volatiles that may be generated by the composite part 18 as it cures during autoclaving. Such gas volatiles must leave the surface of the composite part 18 during curing in order to produce a composite part 18 of high quality. The breather lay 34 may be fabricated of a woven material. The breather layer 34 may also be fabricated from non-woven polyester or nylon fiber material.

Figure 3:
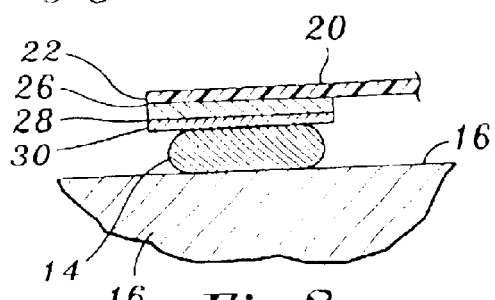
FIG. 3 is an enlarged longitudinal sectional view taken from FIG. 2 illustrating the detail of the sealing flange and the arrangement of a sealant bead with the forming tool.
Figure 4:
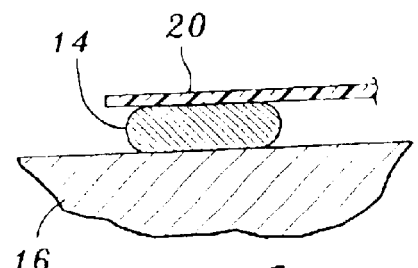
FIG. 4 is an enlarged longitudinal sectional view of a reusable vacuum bag of the prior art illustrating the arrangement of the sealing flange with the sealant bead.

Turning now to FIGS. 3 and 4, shown in both views is the arrangement of a sealing flange 22 of the reusable vacuum bag 10 with the forming tool 16. FIG. 3 is an enlarged longitudinal sectional view taken from FIG. 2 illustrating the detail of the sealing flange 22 and the arrangement of the sealant bead 14 with the forming tool 16. FIG. 4 is an enlarged longitudinal sectional view of a reusable vacuum bag 10 of the prior art illustrating the arrangement of the sealing flange 22 with the sealant bead 14. The sealing flange 22, also shown in FIGS. 1 and 2, extends peripherally about the elastomeric layer 20. It is contemplated that the sealing flange 22 may have a width in a range of from about ½ inch to about 3 inches, although the width of the sealing flange 22 may fall outside of this range. In contrast to vacuum bags of the prior art wherein the sealant bead 14 is disposed against the sealing flange 22 as shown in FIG. 4, the sealing flange 22 of the present invention includes the fluoroelastomeric strip 24 extending substantially along the sealing flange 22, as shown in FIG. 3. The sealant bead 14 is applied between the sealing flange 22 and the fluoroelastomeric strip 24 for sealing the fluoroelastomeric strip 24 to the forming tool 16. Importantly, the sealant bead 14 provides vacuum tight sealing of the reusable vacuum bag 10 to the forming tool 16 during debulking and autoclave curing, of the composite part 18. The fluoroelastomeric strip 24 is also shown in FIG. 3 having first and second surfaces 26, 28 with the first surface 26 thereof disposed against the sealing flange 22. The elastomeric layer 20 and the fluoroelastomeric strip 24 each have polymers. The polymers of the elastomeric layer 20 cross-link with the polymers of the fluoroelastomeric strip 24 at an elevated temperature typical of autoclaves and ovens. The cross-linking of the polymers may be such that a permanent bond is formed between the sealing flange 22 and the fluoroelastomeric strip 24 at the first surface 26. The elastomeric layer 20 and the fluoroelastomeric strip 24 may both include a peroxide curative that initiates vulcanization of the fluoroelastomeric strip 24 to the elastomeric layer 20 at an elevated temperature to form a permanent bond therebetween.

Also shown in FIGS. 3 and 4 is the sealant bead 14 disposed between the elastomeric layer 20 and the fluoroelastomeric strip 24. The fluoroelastomeric strip 24 in FIG. 3 has a second surface 28 opposite the first surface 26. The second surface 28 is releaseably adhered at the second surface 28 to the sealant bead 14. It is contemplated that the sealant bead 14 may include tacifiers therein. The tacifiers may provide adhesion between the sealant bead 14 and the fluoroelastomeric strip 24. Advantageously, as opposed to silicone rubber, fluoroelastomeric material adheres to commercial sealant tapes.

Commercial sealant tapes such as zinc chromate sealant tape also contain vulcanizing curatives. The curatives in the sealant tape allow the sealant bead 14 to vulcanize at an elevated temperature, resulting in cross-linking within the sealant tape material itself and subsequent hardening or thermosetting of the sealant bead 14. Such a hardening of the sealant bead 14 is desirable in that the hardened sealant bead 14 is easily removable with little or no residue from both the forming tool 16 and the fluoroelastomeric strip 24 by rolling the tape back onto itself. The vulcanized sealant bead 14 is not reusable and is discarded. In comparison, a sealant bead 14 that is not vulcanizing would retain its pre-autoclave, gummy consistency making removal from the sealing surface difficult and time-consuming.

Advantageously, fluoroelastomeric material has strength and tear resistance that is compatible for use with an elastomeric layer 20 formed of silicone rubber. Furthermore, the semi-rigid nature of the fluoroelastomeric material enhances its conformability to forming tools 16 having complex curved surfaces with small inside or outside radii. Notably, as was mentioned above, it has been found that Mosites # 10320-C, manufactured by the Mosites Rubber Company of Fort Worth, Tex. is a preferred material that may be utilized for forming the fluoroelastomeric strip 24. In contrast to prior art reusable vacuum bags wherein the sealant tape is applied directly to a silicone rubber elastomeric layer 20 at the sealing flange 22 with poor adhesion therebetween, in the present invention, the sealant bead is applied to the fluoroelastomeric strip. It has been found that the preferred fluoroelastomeric material, Mosites #10320-C, has a fluorine content of 70%. The high fluorine content in Mosites #10320-C provides a high degree of chemical inertness and resistance to degradation that may otherwise occur during exposure to volatiles created during the autoclaving process. Without resistance to attack from volatiles, tacifiers and acids, the mechanical properties of the sealing flange 22 would degrade after two or three autoclave cycles to a degree such that the vacuum bag would not be reusable.

As shown in FIG. 3, the first surface 26 of the fluoroelastomeric strip 24 is bonded to the sealing flange 22. The second surface 28 of the fluoroelastomeric strip 24 is releaseably adhered to the sealant bead 14. It is contemplated that at least one layer of a release agent 30 may be disposed between the sealant bead 14 and the second surface 28 of the fluoroelastomeric strip 24 to prevent permanent bonding therebetween during autoclaving. The fluoroelastomeric strip 24 may be formed of fluorinated synthetic rubber, which may be uncured fluoroelastomeric rubber. The fluoroelastomeric strip 24 may be formed of a material having a fluorine content of at least 70%. As was previously mentioned, Mosites #10320-C is a preferred fluoroelastomeric material that will form a permanent bond with an elastomeric layer 20 formed of silicone rubber.

Figure 5:
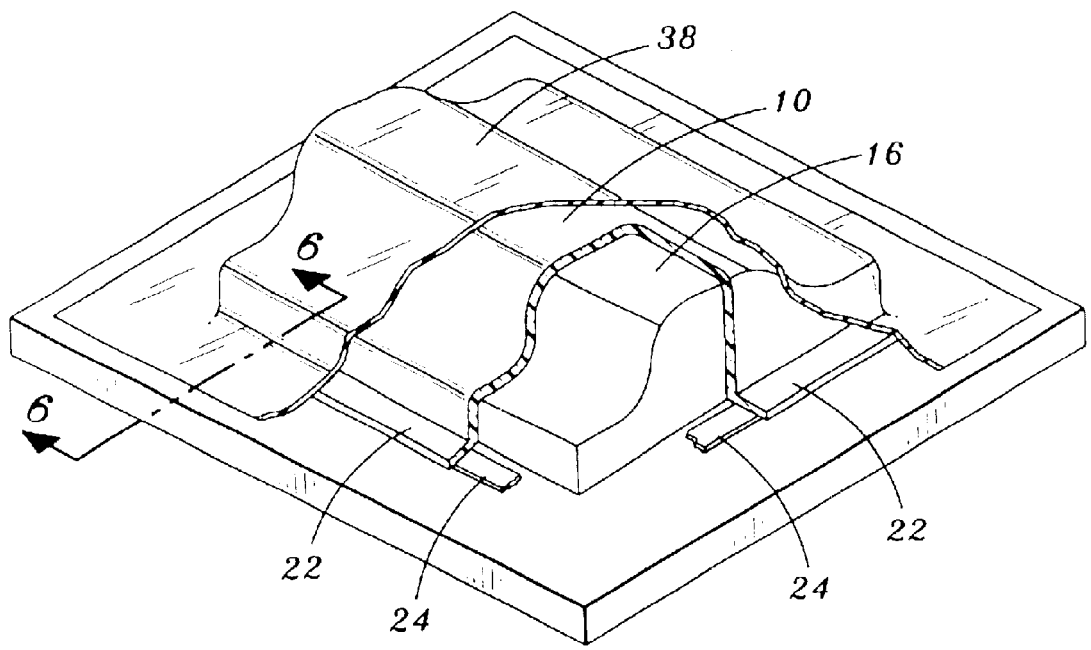
FIG. 5 is a broken away perspective view of the forming tool and the reusable vacuum bag during fabrication thereof and FIG. 6 is an enlarged partial longitudinal sectional view taken along line 6—6 of FIG. 5 illustrating the detail of the sealing flange during fabrication of the reusable vacuum bag.

Referring to FIG. 5, the method of fabricating the reusable vacuum bag 10 will now be discussed. FIG. 5 is a broken away perspective view illustrating the forming tool 16 and the reusable vacuum bag 10 during its fabrication thereon. As can be seen in FIG. 5 the forming tool 16 used in fabricating the reusable vacuum bag 10 is identical to the forming tool 16 of FIG. 1 which is used to form the composite part 18. As was mentioned above, the reusable vacuum bag 10 may be formed of at least one elastomeric layer 20, although multiple elastomeric layers 20 may make up the reusable vacuum bag 10. The elastomeric layer 20 may be formed of cured or uncured silicone rubber and may have a thickness of from about 0.030 inches to about 0.120 inches, although the thickness of the silicone rubber may be variable at different sections of the reusable vacuum bag 10.

The reusable vacuum bag 10 is fabricated by providing the elastomeric layer 20 with the sealing flange 22 extending about its periphery. The fluoroelastomeric strip 24 may be formed of fluorinated synthetic rubber, which may be uncured fluoroelastomeric rubber. Additionally, the uncured fluoroelastomeric rubber may contain a peroxide curative for initiating vulcanization with the silicone rubber. As mentioned above, Mosites #10320-C is the preferred fluoroelastomeric material that will bond with the elastomeric layer 20 formed of silicone rubber due in part to its peroxide curative content. Furthermore, Mosites #10320-C adheres to commercially available sealant tapes such as zinc chromate sealant tape while being chemically resistant to attack from tacifiers that may contact the fluoroelastomeric strip 24 during autoclaving. The chemical resistance of Mosites #10320-C is due in part to its hitch fluorine content of 70%.

Figure 6:
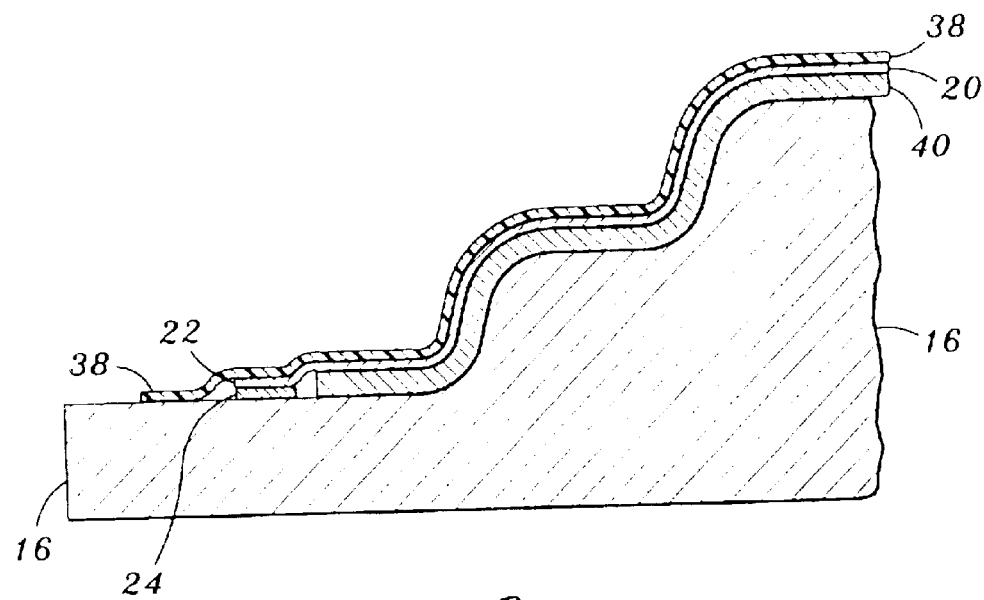

Referring now to FIG. 6, shown is an enlarged partial longitudinal sectional view taken along line 6—6 of FIG. 5 illustrating the detail of the sealing flange 22 during fabrication of the reusable vacuum bag 10. The forming tool 16 is covered with the elastomeric layer 20 such that the sealing flange 22 extends beyond the forming tool 16 perimeter to facilitate sealing of the reusable vacuum bag 10 to the forming tool 16. As can be seen in FIG. 6, the forming tool 16 may be overlaid with a model part 40 prior to covering with the elastomeric layer 20. Such a model part 40 would be preformed and would have the same thickness and geometric features of the composite part 18 which is to be ultimately molded on the forming tool 16. However, the use of the model part 40 depends to some degree on the thickness of the laminates. If the laminate thickness is small and the lateral geometric features are not too large, the model part 40 need not be incorporated into the process for fabricating the reusable vacuum bag 10. The reusable vacuum bag 10 may be overlaid directly on the forming tool 16.

Turning back to the description of the process for fabricating the reusable vacuum bag 10, the fluoroelastomeric strip 24 is provided having a shape substantially matching that of the sealing flange 22. The fluoroelastomeric strip 24 is then positioned between the sealing flange 22 and the forming tool 16 such that the fluoroelastomeric strip 24 is substantially aligned along the sealing flange 22. A nylon bag 38 is provided for vacuum bagging. The combination of the forming tool 16 and the overlaying reusable vacuum bag 10 is then vacuum bagged with the nylon bag 38 using conventional bagging techniques. The reusable vacuum bag 10 is then cured in an autoclave or oven at elevated temperature and pressure. After curing, the nylon bag 38 and the reusable vacuum bag 10 are removed from the forming tool 16. The nylon bag 38 is discarded and the reusable vacuum bag 10 is stabilized by postcuring in an oven at ambient pressure and elevated temperature greater than the curing temperature. The elevated temperature during stabilization is set to be higher than any temperature to which the reusable vacuum bag 10 will be subjected during future debulking and autoclaving operations. The elevated temperature used during the postcuring step may be about 50° higher than that used in the autoclaving step. The stabilization step minimizes further shrinkage of the reusable vacuum bag 10 and stabilizes the shape of the reusable vacuum bag 10. In order to improve the seal between the sealant bead 14 and the fluoroelastomeric strip 24, the second surface 28 may be lightly hand-abraded with 120-grit sandpaper by rubbing the second surface 28 for no more than one minute such that any sheen of the second surface 28 may be slightly dulled. In order to further improve the ease with which the sealant bead 14 may be removed from the fluoroelastomeric strip 24, the release agent 30 may be applied to the fluoroelastomeric strip 24 after the stabilization step.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A reusable vacuum bag configured for application of at least one sealant bead, the sealant bead providing vacuum tight sealing of the reusable vacuum bag to a forming tool during fabrication of a composite part on the forming tool, the reusable vacuum bag comprising:

at least one elastomeric layer having polymers, the elastomeric layer being sealable to the forming tool and having a sealing flange extending peripherally thereabout; and a fluoroelastomeric strip having polymers and extending substantially along the sealing flange and having first and second surfaces, the polymers of the elastomeric layer cross-linking with the polymers of the fluoroelastomeric strip at an elevated temperature such that a permanent bond is formed between the sealing flange and the fluoroelastomeric strip at the first surface, the fluoroelastomeric strip being releaseably adhered at the second surface to the sealant bead.

2. The reusable vacuum bag of claim 1 wherein the elastomeric layer and the fluoroelastomeric strip both include a peroxide curative, the peroxide curative initiating vulcanization of the fluoroelastomeric strip to the sealing flange at an elevated temperature such that a permanent bond is formed therebetween.

3. The reusable vacuum bag of claim 2 wherein the vulcanization of the fluoroelastomeric strip to the sealing flange forms double-oxygen bonds therebetween.

4. The reusable vacuum bag of claim 1 wherein the sealant tape includes tacifiers therein for providing adhesion between the sealant bead and the fluoroelastomeric strip.

5. The reusable vacuum bag of claim 1 wherein the fluoroelastomeric strip is formed of a material having a fluorine content of at least 70%.

6. The reusable vacuum bat of claim 1 wherein the fluoroelastomeric strip is conformable to the forming tool.

7. The reusable vacuum bag of claim 1 wherein the fluoroelastomeric strip is formed of fluorinated synthetic rubber.

8. The reusable vacuum bag of claim 1 wherein the fluoroelastomeric strip is uncured fluoroelastomeric rubber.

9. The reusable vacuum bag of claim 1 wherein the elastomeric layer is silicone rubber.

10. The reusable vacuum bag of claim 1 wherein the elastomeric layer is uncured silicone rubber.

11. The reusable vacuum bag of claim 1 wherein the sealant bead is formed of zinc chromate sealant tape.

12. The reusable vacuum bag of claim 1 wherein the width of the sealing flange is in a range of from about ½ inch to about 3 inches.

13. The reusable vacuum bag of claim 1 wherein the elastomeric layer has a thickness of from about 0.030 inches to about 0.120 inches.

14. A method of fabricating a reusable vacuum bag configured for application of at least one sealant bead, the sealant bead providing vacuum tight sealing of the reusable vacuum bag to a forming tool during fabrication of a composite part formed on the forming tool, the method comprising the steps of:

providing an elastomeric layer having a sealing flange extending peripherally thereabout;

covering the forming tool with the elastomeric layer such that the sealing flange extends beyond the forming tool perimeter;

providing a fluoroelastomeric strip having a shape substantially matching that of the sealing flange;

positioning the fluoroelastomeric strip between the sealing flange and the forming tool such that the fluoroelastomeric strip is substantially aligned along the sealing flange;

providing a nylon bag for vacuum bagging the reusable vacuum bag;

curing the reusable vacuum bag against the forming tool at elevated temperature and pressure;

removing the reusable vacuum bag from the nylon bag; and stabilizing the reusable vacuum bag against further shrinkage by postcuring in an oven at an elevated temperature greater than the curing temperature.

15. The method of claim 14 further including the step of applying a release agent to the fluoroelastomeric strip.

16. The method of claim 15 further including the step of covering the forming tool with a model part and wherein the model part is covered by the elastomeric layer.

17. The method of claim 15 wherein the postcuring step is carried out in an oven at ambient pressure.

18. The method of claim 15 wherein the postcuring step is carried out in an oven at a temperature of about 50° higher than that used in the curing step.

19. The method of claim 15 wherein the elastomeric layer is uncured silicone rubber.

20. The method of claim 15 wherein the fluoroelastomeric strip is uncured fluoroelastomeric rubber containing a peroxide curative.

21. The reusable vacuum bag of claim 15 wherein the fluoroelastomeric strip is formed of a material having a fluorine content of at least about 70%.

* * * * *